(Model.)
G. C. THOMAS.
METHOD OF MAKING LAMP FIXTURES.
No. 306,550. Patented Oct. 14, 1884.
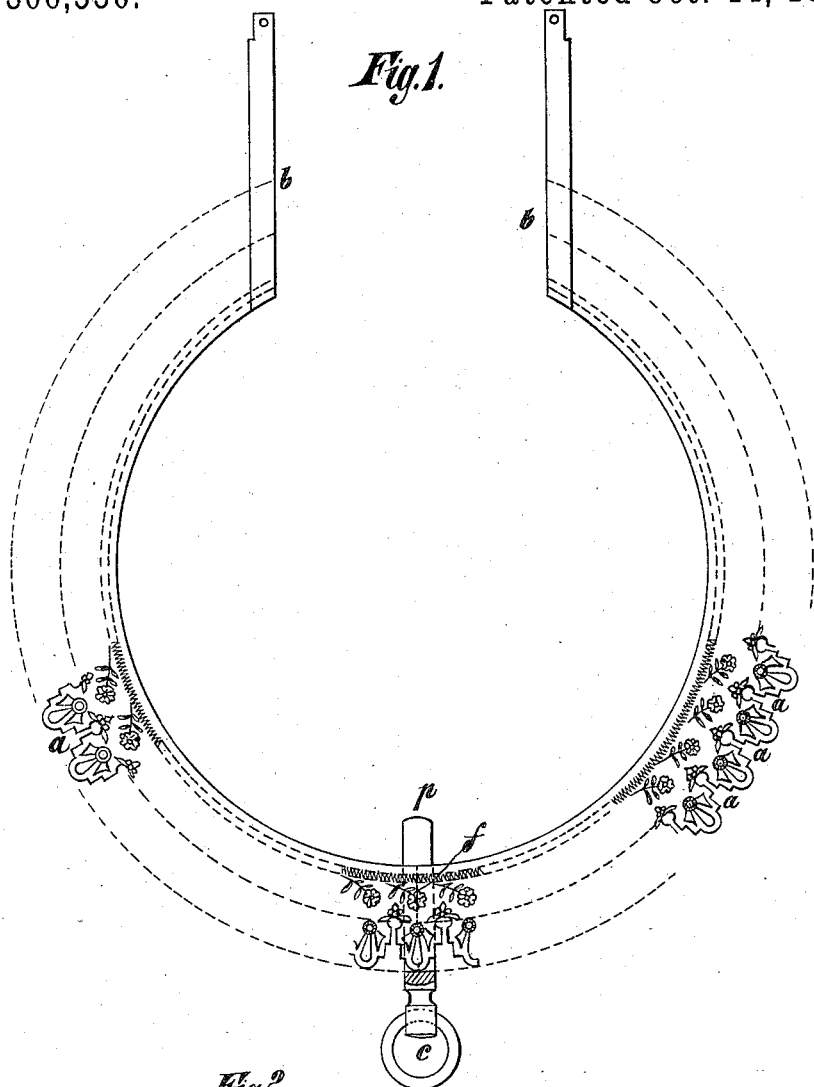
Fig. 1.
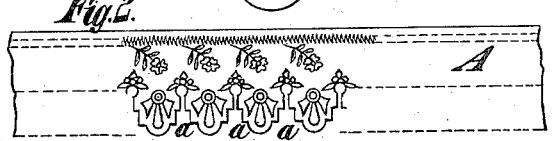
Fig. 2.
Fig. 3.
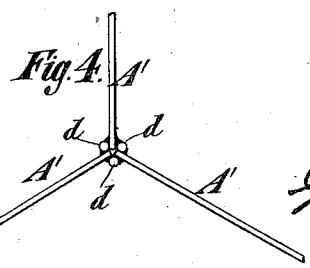
Fig. 4.
Witnesses
Nicholas Jenkins
Geo. H. Burham
Inventor
George C. Thomas
N. PETERS, Photo-Lithographer, Washington, D. C.

UNITED STATES PATENT OFFICE.

GEORGE C. THOMAS, OF WATERBURY, CONNECTICUT.

METHOD OF MAKING LAMP-FIXTURES.

SPECIFICATION forming part of Letters Patent No. 306,550, dated October 14, 1884.

Application filed August 21, 1883. (Model.)

*To all whom it may concern:*

Be it known that I, GEORGE C. THOMAS, of Waterbury, in the county of New Haven and State of Connecticut, have invented a certain new and useful Improvement in Lamp-Fixtures, of which the following is a specification.

The object of this improvement is to provide for making a very cheap yet highly ornamental frame, suitable to be used in a lamp-fixture for supporting a lamp-reservoir and appurtenances.

The improvement consists in taking a strip or strips of sheet metal, ornamenting the same along one edge in such manner as to make cuts and perforations, and in subsequently bending the same edgewise into longitudinally-curved form. A frame may be thus formed which, while sufficiently strong to support a lamp, is light, highly ornamental, and cheap.

In the accompanying drawings, Figure 1 is a side view of a frame embodying the improvement. Fig. 2 is a side view of a strip of metal ornamented and ready for bending to form the frame. Fig. 3 is an edge view thereof, and Fig. 4 is a bottom view or inverted plan of a frame of modified construction.

Similar letters of reference designate corresponding parts in all the figures.

Referring to Fig. 2, A is a straight strip of metal, which may have ornaments embossed upon or indented into sides, and has one edge ornamented by forming scallops in it or otherwise forming in it inwardly-extending cuts. The cuts $a$ shown in this example of my invention consist of the notches or spaces between the scallops. The strip, after being thus ornamented, is bent edgewise into curved form, as shown in Fig. 1, to form a frame. Its ends have fastened to them upright arms $b$. These arms may be made of metal bifurcated to embrace the ends of the strip, and secured thereto by solder or otherwise.

To bend the ornamented strip it may be clamped and held in a vise at different points successively and bent by hand to give it the desired form. In case it should buckle slightly, or become distorted in bending, it may be readily flattened with a hammer. A pull-piece, $c$, may be arranged at the lower part of the strip. It will preferably be made of metal bifurcated so as to embrace the strip, and fastened thereto by soldering or otherwise. As shown, its bifurcated ends extend above the strip and form a peg, $p$, on which may be fitted a lamp-reservoir having a suitable cavity in its bottom. If desirable, two short strips may be ornamented as described, and bent so as to severally form one side or half of a frame, instead of making a frame of a single strip. The adjacent ends of the two strips may be united by solder or otherwise. I have indicated the position of the meeting ends of such strips by the dotted line $f$, Fig. 1. I may fasten three or more short strips, A, together in different planes equidistant, as indicated in Fig. 4. Pieces of wire, $d$, may in this case be arranged at the junction of the strips, and the whole united by solder, so as to make a strong joint. Chains or other devices may be fastened to the upper ends of the arms $b$ to suspend the frame.

It will be seen that by my invention I produce a frame which is light, cheap, and highly ornamental. The cutting of ornaments in the outer edge not only embellishes it, but facilitates bending it edgewise.

I have filed an application (No. 116,064) for Letters Patent for an improvement in lamp-fixtures December 31, 1883. I do not herein claim anything claimed therein.

I do not herein claim a product consisting of a frame for a lamp-fixture made of a strip or strips of sheet metal having ornaments cut into one of its edges and bent edgewise into longitudinally-curved form, as I intend to make the same the subject of another application for Letters Patent.

What I claim as my invention, and desire to secure by Letters Patent, is—

The process of making a frame for a lamp-fixture, consisting in taking a strip or strips of sheet metal, ornamenting the same by perforating and cutting at one edge, and in subsequently bending the same into longitudinally-curved form, substantially as specified.

G. C. THOMAS.

Witnesses:
GEO. H. BENHAM,
H. H. WALKER.